(12) United States Patent
Breight et al.

(10) Patent No.: US 8,369,324 B1
(45) Date of Patent: Feb. 5, 2013

(54) VARIABLE COMPRESSION QUEUE

(75) Inventors: Alan R. Breight, Boulder, CO (US);
Jeffrey Chu, Arvada, CO (US); Marc A. Geist, Broomfield, CO (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 647 days.

(21) Appl. No.: 12/240,306

(22) Filed: Sep. 29, 2008

(51) Int. Cl.
*H04L 12/28* (2006.01)
*H04L 12/56* (2006.01)
*H04J 3/24* (2006.01)
*H04J 3/18* (2006.01)

(52) U.S. Cl. .......... 370/389; 370/474; 370/477

(58) Field of Classification Search .......... 340/172.5, 340/347; 341/51, 60, 61, 65, 67, 107, 106; 348/384.1, 403.1, 420.1, 427.1, 440.1; 358/133, 358/138, 260; 364/200; 370/79, 82, 83, 370/94, 99, 118, 389, 474, 477, 479, 506, 370/514; 371/32, 33; 375/58, 122, 240.24, 375/240.29; 382/43, 56

See application file for complete search history.

(56) References Cited

U.S. PATENT DOCUMENTS

| 4,730,348 A | 3/1988 | MacCrisken |
| 6,667,700 B1 * | 12/2003 | McCanne et al. ............... 341/51 |
| 6,862,278 B1 | 3/2005 | Chang et al. |
| 2007/0096954 A1 * | 5/2007 | Boldt et al. ..................... 341/50 |

FOREIGN PATENT DOCUMENTS

WO   WO 2007050740   5/2007

OTHER PUBLICATIONS

Gordon, "Webseter's New World English Grammar Handbook", 2009, pp. 107-108.*
GoldenGate; "Global Data Synchronization Platform Technical Overview"; a GoldenGate Whitepaper; 16 pages; Jan. 2003.

* cited by examiner

*Primary Examiner* — Andrew Lai
*Assistant Examiner* — Adam Duda
(74) *Attorney, Agent, or Firm* — Sheridan Ross P.C.

(57) ABSTRACT

The disclosure is directed to an embodiment of a system that includes: (a) a queue to receive compressed blocks of data elements to be transmitted to a destination node and a variable compression module that, in response to an unacceptable connection status with the destination node, an unacceptable level of local processing resources, and/or an unacceptable level of local memory resources, changes a number of data elements in the block and/or increases a degree of compression.

19 Claims, 2 Drawing Sheets

VARIABLE COMPRESSION QUEUE

FIELD

The disclosure relates generally to data communications over distributed processing networks and particularly to buffering communications between distributed applications.

BACKGROUND

FIG. 1 depicts a conventional architecture for exchanging communications over a distributed processing network. An application in a client 100 generates data elements and forwards them to a queue 104. The data elements remain in the queue 104 until a messaging application, such as Java Messaging Service (JMS), packetizes the data elements and transmits the packets over the Wide Area Network 108 to an application in the server 112. The occupancy and residence time in the queue 104 depends on a variety of factors, including the available bandwidth and resources of the WAN 108.

Because of packet acknowledgement delays, buffering capacity issues, and the substantial processing and resource consumption overhead from sending single data elements packet-by-packet over the WAN 108, the messaging application groups or bulks data elements into multi-member sets or bulks and compresses the sets using a suitable compression algorithm. The compressed sets are then placed in the queue 104. Each set is transmitted, in a single packet, to the far end application. In one configuration, a fixed bulk size of a number of data elements, or bulk size, is used to initiate delivery. In another configuration, the bulk size varies in response to a timeout interval. The timeout interval determines the size of, or number of data elements in, the bulk delivery and depends on predetermined characteristics. Bulking and compressing messages can conserve memory space allocated to the queue 104 and reduce consumption of network resources.

Problems arise when connectivity between the client 100 and server 112 is disrupted or worsened due to intermediate node outages or traffic congestion. Current messaging applications use a single fixed or time invariant compression algorithm and either a constant bulk membership size or a bulk membership having predetermined, unchangeable characteristics. They are unable to adjust either the bulk membership size or degree of compression dynamically based on the data rates and outage duration.

SUMMARY

These and other needs are addressed by the various embodiments and configurations of the present disclosure. The disclosure is directed generally to transmission of data elements to destination nodes over a network providing varying levels of transmission quality.

In one embodiment, a system includes:
(a) a queue to receive compressed blocks of data elements to be transmitted to a destination node; and
(b) a variable compression module operable, in response to an unacceptable connection status with the destination node and/or an unacceptable level of local processing and/or memory resources, to change a number of data elements in the block and/or increase a degree of compression.

The bulk size is typically changed either by selecting a new, fixed bulk size or changing a timeout period used to determine the bulk size.

The degree of compression is typically changed either by selecting a new compression algorithm or changing one or more inputs to the compression algorithm.

Whether or not the connection status is acceptable or unacceptable is typically determined by comparing bandwidth measures and/or Quality of Service (QoS) or Grade of Service (GoS) metrics against one or more selected thresholds.

Whether or not the level of local resources is acceptable or unacceptable is typically determined by one or more of comparing the available or unused memory allocated to the queue and/or total memory of the local client, the allocated or total memory in use, the level of Central Processing Unit (CPU) utilization, and the queue size occupancy level against one or more selected thresholds.

The present disclosure can provide a number of advantages depending on the particular configuration. The disclosed embodiments and configurations can provide dynamic behavior of buffering and persistence based on available resources. They can provide intelligent queuing. They can provide dynamic compression or persistence strategies based on the dynamic nature of network reliability and performance or available system resources. They can more robustly address intermittent network outages, long term server (consumer) outages, periodic memory restrictions, and disk space limitations. They can use delivery metrics computed over multiple data elements to change dynamically the compression mechanism and do not consider the content of the data elements in determining the compression mechanism. In contrast, video/audio applications base compression on the content of the data elements, and do not change the compression algorithm based on dynamic delivery statistics. They can provide an abstraction of buffering and queuing so as not to burden the using clients with any buffering management overhead. They can, for example, be configured as a pluggable component and a straight-forward application programmable interface that can be used easily by client applications. Other implementation benefits include performance, resiliency (by guarding against loss of data), substantially optimized compression allows larger amounts of data to be buffered, bandwidth reduction (which is directly proportional to performance increase), lower memory requirements, lower input/output requirements, and reduction in recovery time because of compression and reduced processing overhead.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "data element" refers to a unit of information or other output of a computational component, such as an application. The data element may be in the form of data alone or a message containing data.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

Figure 1:
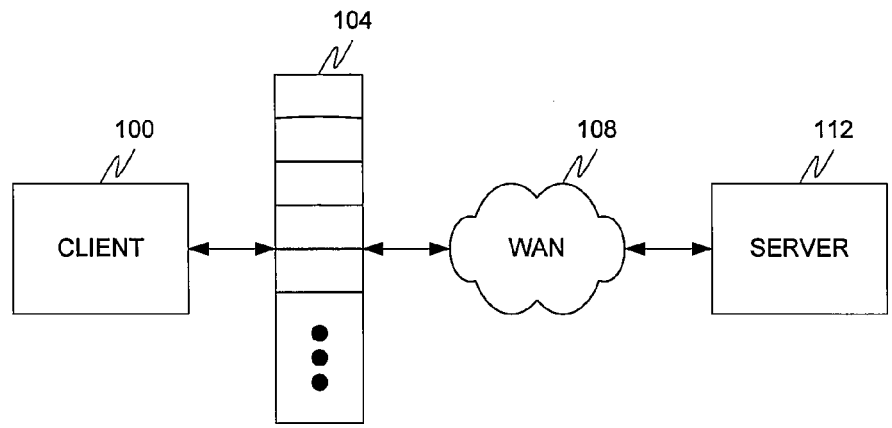
FIG. 1 is a conventional network architecture.
Figure 2:
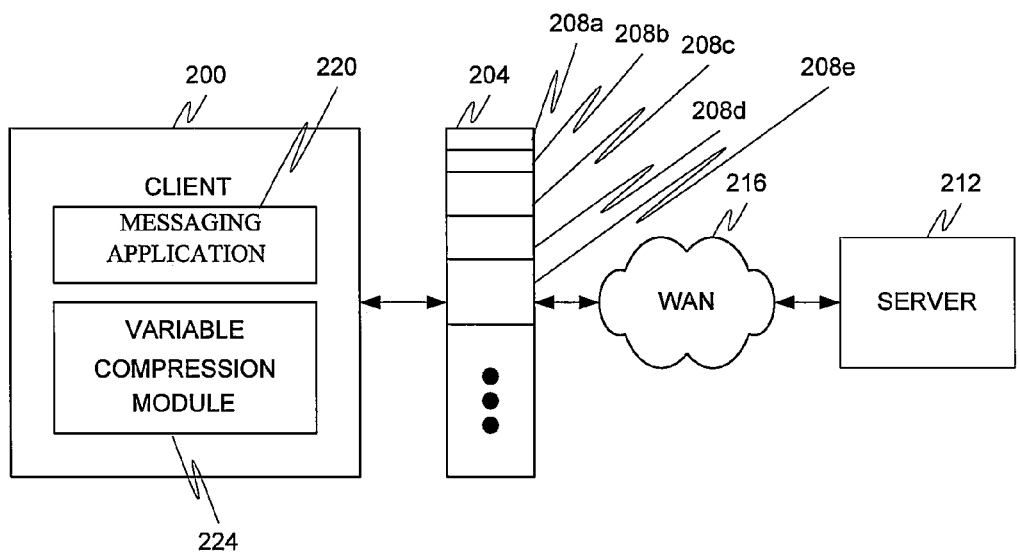
FIG. 2 is a network architecture according to an embodiment.

FIG. 2 is a network architecture according to an illustrative embodiment. The architecture includes a client 200, including a first application (not shown) that generates data elements, a queue 204 that buffers the data elements 208a-e for packetization, a server 212 including a second application (not shown) that consumes or otherwise processes the data elements, and a WAN 216 interconnecting the client 200 and server 212.

The client 200 includes a computer readable medium (not shown) and processor (not shown). The computer readable medium comprises a messaging application 220 and a variable compression module 224.

The messaging application 220 packetizes the data elements for transmission to the server 212. Although any messaging application may be employed, an exemplary messaging application is JMS.

The variable compression module 224 monitors the rate or velocity of data element reception or transmission and the health and bandwidth of the connection between the client and server and, to use efficiently the memory allocated to the queue 204, responds dynamically to an unhealthy connection or unacceptable bandwidth constraints. Responses by the variable compression module 224 include increasing the bulk size, homogenizing the sizes of the compressed bulks occupying the queue 204, and increasing a compression level or degree. Bulk size is increased typically by lengthening the timeout interval. Bulk size is homogenized by removing the compressed bulks currently occupying the queue, uncompressing them, and recombining the data elements to realize a larger bulk size. The recombined data elements are then compressed and placed in the queue 204 at or near their prior positions. In this way, the ordering of the data elements is maintained. The compression level or degree can be increased by selecting a new compression algorithm having a higher degree of compression or by altering the algorithmic inputs or other parameters to the current compression algorithm to provide a selected, higher level or degree of compression. In this manner, the bulk size and degree of compression can be changed dynamically based on characteristics, such as duration or estimated duration of the connection outage or Quality of Service (QoS) problems. In one configuration, the module 224 selects an amount of compression based on available or unavailable memory resources, input/output limitations, QoS metrics, bandwidth measures, and loss of connectivity with the server. The compression takes place in a continuum of time (maximum performance) and space (maximum data size reduction).

By way of illustration, the client 200 monitors network performance metrics, such as packet loss, latency, packet delay, jitter, error rate, and bandwidth utilization to determine the data element transmission rate. As will be appreciated, "packet latency" or "packet delay" refers to the length of time required for a packet of data to travel from one designated point to another. As the client 200 detects a slowing or cessation in communications with the server 212, the variable compression module 224 increases the block or bulk size from 1,000 to 100,000 data elements or more. Likewise, timeouts can be increased from 1 second to 100 seconds or more. As a result, the queue 204 can store more compressed data due to the increased compression efficiency. The module 224 does not rely on the static nature of timeouts and block size but uses metrics on connectivity, throughput, and variability of data rate. This can provide data resiliency and maintain the client 200 operating at its own pace until resolution of the outage has been resolved. When the variable compression module 224 detects consumption at a regular rate, the module 224 can throttle back to a normal rate, block size, or degree of compression.

Figure 3:
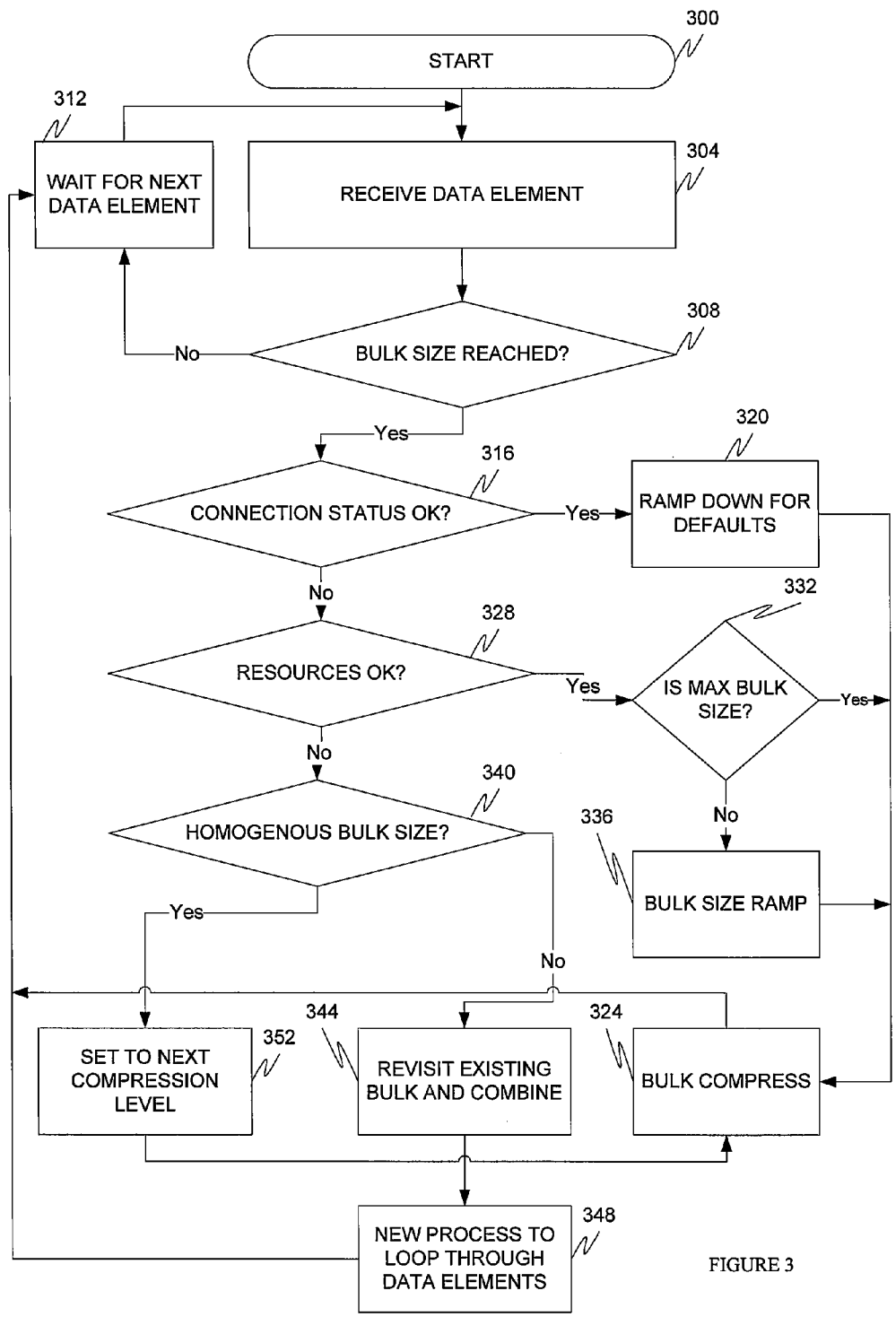
FIG. 3 is a process flowchart according to an embodiment.

The operation of the variable compression module 224 will now be discussed with reference to FIGS. 2 and 3. The module 224 initializes in step 300.

In step 304, the module 224 receives a next data element.

In decision diamond 308, the module 224 determines whether the data element, coupled with unbulked and uncompressed data elements previously received, equals the current bulk size requirement. When the data element and unbulked and uncompressed data elements are less than the current bulk size requirement, the module 224 proceeds to step 312 and waits for the next data element. When the data element and unbulked and uncompressed data elements equal the current bulk size requirement, the module 224 proceeds to decision diamond 316.

In decision diamond 316, the module 224 determines whether the connection status with the destination server 212 is acceptable. The connection status is unacceptable, for example, when an intermediate node has malfunctioned, a link is down, the performance metrics indicate an unacceptable QoS (when compared to a set of QoS metric thresholds), the server 212 is not responding within a selected period of time (when compared to a temporal threshold), the available buffer 204 capacity is at or below a selected threshold. The health or status of the connection and network performance metrics are determined by known techniques.

When the connection status is acceptable, the module 224 proceeds to step 320 and, if the module 224 has previously increased the bulk size requirement, timeout period, or otherwise heightened the algorithmic inputs, the module 224 decreases the bulk size requirement, timeout period, and/or algorithmic inputs to the current compression algorithm to provide a lower degree of compression, and/or selects a compression algorithm producing a lower degree of compression. Typically, the module 224, in a stepwise fashion, increases or decreases bulk size and/or timeout period, changes the algorithmic inputs to the current compression algorithm to provide a higher or lower degree of compression, and/or selects different compression algorithm(s) providing a higher or lower degree of compression. Multiple steps or levels are commonly used. The starting level contains the default settings. In step 324, the module 224 bulk compresses the data elements based on the new settings. In another configuration, the bulk compression is performed using the prior settings, with the new settings from step 320 being used for later received data elements.

When the connection status is not acceptable, the module 224, in decision diamond 328, determines whether the resource(s) are acceptable. The resource(s) include the available or unused memory allocated to the queue 204 and/or total memory of the client 200, the allocated or total memory in use, the level of Central Processing Unit (CPU) utilization, and the queue 204 size occupancy level. The resource(s) are compared to one or more thresholds. For example, the resources are unacceptable when the available or unused memory falls below a first threshold. In another example, the resources are unacceptable when the unavailable or used memory and/or CPU utilization rises above a second threshold.

When the resource(s) are acceptable (or have a first relationship to the threshold(s)), the module 224, in decision diamond 332, determines whether the current block size setting is at the maximum size. If so, the module 224 proceeds to step 324. If not, the module 224 proceeds to step 336 and increases the block size setting to the next higher level. The module then proceeds to step 324 and bulk compresses the data elements using either the prior or new block size setting.

When the resource(s) are not acceptable (or have a second relationship to the thresholds, the module 224, in decision diamond 340 determines whether all of the blocks in the queue 204 are homogenous in size (or are commonly sized). With reference to FIG. 2, blocks 208a and b are smaller than blocks 208c and d, which in turn are smaller than block 208e.

When the block sizes are not homogenous, the module 224, in step 344, decompresses the smaller blocks, and, in step 348, invokes a process to loop through the decompressed data elements, rebundling the data elements into new blocks of the current block size setting, compressing the rebundled data elements, and placing the compressed and rebundled data elements in the queue 204. As noted, the process, in rebundling the data elements and placing the compressed and rebundled data elements in the queue 204 maintains the ordering of the data elements as it existed before steps 344 and 348.

When the block sizes are homogenous, the module 224, in step 352, increases the settings to the next compression level and proceeds to step 324, where the block of data elements are compressed using either the former or new compression settings. The settings can be increased by increasing the bulk size, the timeout period, and/or changing the algorithmic inputs for the current compression algorithm to provide a higher degree of compression, and/or selecting a different compression algorithm providing a higher degree of compression. The module 224 then returns to step 312 and awaits the next data element.

A series of tests were performed to compare three cases, namely variable compression, bulk and compress without variable compression, and no compression. The results are shown in the following Table 1.

| Test Run | Per Bulk | Memory Usage | No. Messages | Bytes/Packet (Average Compression) |
|---|---|---|---|---|
| Variable Compression | 100 ramp to 1,000 data elements | 23.33 Megs | 1,179,300 | 19.8 (51x) |
| Bulk and Compress | 100 data elements | 23.88 Megs | 960,700 | 24.8 (42x) |
| No Bulk Compress | Single data elements | 24.90 Megs | 24,636 | 1,010.7 (1x) |

In the test, maximum memory usage of 25 Meg was used to normalize the comparisons.

As can be seen from Table 1, variable compression provided higher degrees of compression and compression efficiency. Bulk and compress provided only a 42x average compression while variable compression provided a 51x average compression.

The higher average compression provided not only a smaller payload for packets to be transmitted over the network (thereby conserving network resources) but also consumed less memory allocated to the queue 204.

There is, of course, a practical limit on how large the bulk size can be. If the bulk size gets too large, the payload will no longer be able to be carried by a single packet but would need to be split between or among multiple packets.

The exemplary systems and methods of this disclosure have been described in relation to database transaction management. However, to avoid unnecessarily obscuring the present disclosure, the preceding description omits a number of known structures and devices. This omission is not to be construed as a limitation of the scopes of the claims.

Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a client, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the above teachings apply not only to database transaction management but also to any application where information is transmitted between systems and a buffer queue is employed to contain messages for transmission. The variable compression queue is data-agnostic, which broadens the area of its application. Although the above teachings are particularly applicable in high speed data communications, they may be most applicable to environments where timing critical and handshaking communications are involved. Exemplary environments include real time data collection systems, multi-site environments bridged by WANs which exhibit a wide range of QoS, environments with limited available memory and disk resources, environments with periodic fluctuations between production and consumption rates, and environments with data bursting behavior.

In another alternative embodiment, the above teachings apply to a peer-to-peer network.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the embodiments, configurations, and aspects are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the disclosed embodiments, configurations, and aspects after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claims require more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a method, comprising:
receiving, by a device, a plurality of unbulked and uncompressed data elements to be transmitted to a destination node;
grouping a first plurality of the unbulked and uncompressed data elements into a first block of data elements;
grouping a second plurality of the unbulked and uncompressed data elements into a second block of data elements, wherein at least a first size of the first block of data elements is set based on a predetermined characteristic, and wherein the first size of the first block of data elements is different from a second size of the second block of data elements;
compressing the first and second blocks of data elements to form first and second compressed blocks of data elements, respectively;
locating the first compressed block of data elements in a queue for transmission to the destination node;
determining a connection status with the destination node;
in response to an acceptable connection status with the destination node, sending the first compressed block of data elements; and
in response to an unacceptable connection status with the destination node, at least one of changing a number of data elements in the first block and increasing a degree of compression of the first block.

2. The method of claim 1, wherein the predetermined characteristic is a timeout period used to determine the block size.

3. The method of claim 2, wherein the number of data elements in a block of data elements is changed, not only for data elements received in the future, but also for data elements currently in the queue.

4. The method of claim 1, wherein the predetermined characteristic is the number of data elements in the block.

5. The method of claim 1, wherein the degree of compression is increased in response to the unacceptable connection status.

6. The method of claim 4, wherein the degree of compression is changed at least one of by using a different compression algorithm and altering an input to a compression algorithm.

7. The method of claim 1, wherein a level of change of at least one of the number of data elements in the block of data elements, a timeout, and the degree of compression is based on an actual duration, estimated duration, and/or severity of the unacceptable connection status.

8. A non-transitory computer readable medium comprising processor executable instructions that, when executed by the processor, perform the steps of claim 1.

9. A method, comprising:
receiving, by a device, a plurality of data elements for transmission to a destination node;
arranging the plurality of data elements into a first block of data elements and a second block of data elements, wherein the block size is set;
determining whether a connection status with the destination node is acceptable;
determining whether local processing and/or memory resources are acceptable;
applying the following rules:
when at least one of the connection status and resources is unacceptable, performing at least one of the following steps:
increasing the block size of the first or second block of data elements to be compressed and placed in a messaging queue;
increasing a degree of compression of the first or second block of data elements to be compressed and placed in the messaging queue;
changing the block size of a first or second compressed block of data elements currently in the messaging queue; and
when at least one of the connection and resources is acceptable, performing at least one of the following steps:
decreasing the block size of the first or second block of data elements compressed and placed in a messaging queue; and
decreasing a degree of compression of the first or second block to be compressed and placed in the messaging queue.

10. The method of claim 9, wherein the block size is increased or decreased by increasing or decreasing, respectively, a timeout interval.

11. The method of claim 9, wherein the degree of compression is increased or decreased by at least one of selecting a different compression algorithm and altering an input to a common compression algorithm.

12. A non-transitory computer readable medium comprising processor executable instructions that, when executed, perform the steps of claim 9.

13. A system, comprising:
a message application creating a plurality of data elements;

a processor in communication with the memory, the processor operable to execute a variable compression module, the variable compression module operable to:
compose the plurality of data elements into a first block of data elements and a second block of data elements, wherein a size of the blocks is set before compression, and wherein a number of data elements in the first and second blocks of data elements is set;
compress the first and second blocks of data elements to form first and second compressed blocks of data elements, respectively;
in response to one or more of an unacceptable connection status with the destination node, an unacceptable level of local processing resources, and an unacceptable level of local memory resources, at least one of:
change the number of data elements in the first or second block of data elements; and
increase a degree of compression of the first or second block of data elements; and
a memory comprising a queue, wherein the queue is operable to receive the first and second compressed blocks of data elements to be transmitted to a destination node.

14. The system of claim 13, wherein the number of data elements in the block is changed in response to the unacceptable connection status and the number is changed by changing a timeout period used to determine the block size.

15. The system of claim 14, wherein the number of data elements in a block is changed not only for data elements received in the future but also for data blocks currently queued.

16. The system of claim 13, wherein a timeout used to determine the block size is changed in response to the unacceptable connection status.

17. The system of claim 13, wherein the degree of compression is increased in response to the unacceptable connection status.

18. The system of claim 16, wherein the degree of compression is changed at least one of by using a different compression algorithm and altering an input to a compression algorithm.

19. The system of claim 13, wherein a level of change of at least one of the number of data elements in the block of data elements, a timeout, and the degree of compression is based on an actual duration, estimated duration, and/or severity of the unacceptable connection status.

* * * * *